(12) United States Patent
Natsuyama

(10) Patent No.: US 6,498,631 B2
(45) Date of Patent: Dec. 24, 2002

(54) PANEL LIGHT SOURCE DEVICE

(75) Inventor: Yoshifumi Natsuyama, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/681,959

(22) Filed: Jun. 29, 2001

(65) Prior Publication Data

US 2002/0008806 A1 Jan. 24, 2002

(30) Foreign Application Priority Data

Jul. 5, 2000 (JP) .................................... 2000-203294

(51) Int. Cl.[7] .................... G02F 1/1335; G02F 1/1333
(52) U.S. Cl. ...................... 349/62; 349/65; 349/58; 362/561
(58) Field of Search .................... 349/61, 62, 63, 349/65, 58; 362/84, 362, 561

(56) References Cited

U.S. PATENT DOCUMENTS 6,379,016 B1 * 4/2002 Boyd et al. .................. 349/63
6,425,673 B1 * 7/2002 Suga et al. .................. 349/65
2001/0055076 A1 * 12/2001 Ochi et al. .................. 349/63

FOREIGN PATENT DOCUMENTS

| JP | 09-152577 | * | 6/1997 |
| JP | 11-084351 | * | 3/1999 |
| JP | 2001-305538 | * | 10/2001 |

* cited by examiner

Primary Examiner—William L. Sikes
Assistant Examiner—Tarifur R. Chowdhury
(74) Attorney, Agent, or Firm—Derek S. Jennings

(57) ABSTRACT

A panel light source device includes a light source, a light guide plate for guiding and diffusing light from the light source, and a frame for housing the light guide plate. The frame has a convexity inside thereof and the light guide plate has a concavity on a side or lower surface thereof. The convexity and the concavity are engaged with each other, and the light guide plate is provided in the frame so as to cover at least a part of an upper surface of the light guide plate.

13 Claims, 5 Drawing Sheets

PANEL LIGHT SOURCE DEVICE

BACKGROUND OF THE INVENTION

The present invention relates to a display device and a panel light source device, more particularly to a display device and a panel light source device, which have locating portions or engaging portions on a light guide plate and a frame.

As an image display device for various monitors for a personal computer and so on, a liquid crystal display device has been remarkably widespread. The liquid crystal display device generally has a liquid crystal display panel and a backlight unit disposed on at the rear thereof. The liquid crystal display panel performs an image display by controlling light transmitted therethrough. Among some types of liquid crystal display devices, there is one having a side light type backlight. This type of liquid crystal display device has a cathode fluorescent tube as a light source disposed on a side of a display surface for the purpose of thinning the liquid crystal display device.

FIG. 1 is a schematic view showing a liquid crystal display device 10 having a side light type backlight unit. In the drawing, a reference numeral 11 denotes a backlight unit, a numeral 12 a liquid crystal panel (liquid crystal cell), and a numeral 13 a diffusion sheet for diffusing light to make the brightness even on a liquid crystal display panel surface. A reference numeral 14 denotes a prism sheet for converging light to improve a luminance on the front surface of the display, reference numeral 15 is a light guide plate for guiding and diffusing light from a light source, and reference numeral 16 is a frame for accommodating parts of the backlight unit 11 such as the light guide plate and the prism sheet therein. A reference numeral 17 denotes a cold cathode tube 17 as a light source, reference numeral 18 is a bezel for holding and protecting the liquid crystal cell 12 and the backlight unit 11 from the outside thereof. The backlight unit 11 is made of the diffusion sheet 13, the prism sheet 14, the light guide plate 15, the frame 16 and the cold cathode tube 17. The cold cathode tube 17 is disposed inside the frame 16 and is not directly shown in the drawing.

In order to prevent a rattle or a positional shift of each part, it is necessary to locate and fix each part of the backlight unit 11 in the frame 16. Particularly, since the light guide plate 15 is thick in comparison with other optical parts, it is subject to be broken. Alternatively, the light guide plate 15 may sometimes destroy the cold cathode tube 17 by colliding with the cold cathode tube 17. Therefore, it is necessary to locate and fix the light guide plate 15 on the frame 16 accurately. A method for fixing the light guide plate 15 on the frame 16 is that convexities are provided on the light guide plate 15, opening portions are provided on the frame 16, and the convexities and the opening portions are engaged with each other to be located and fixed with each other. Optical sheets, such as the prism sheet 14 and the diffusion sheet 13, are attached to the light guide plate 15 by adhesive to be fixed thereto.

Techniques for forming convexities on a light guide plate and engaging them with holes of a frame as described above are described, for example, in the gazette of Japanese Patent Laid-Open No. Hei 9-152577. However, there have existed some problems in providing such convexities on a light guide plate. One problem is that the convexities are subject to be broken. The light guide plate is typically formed of acrylic resin. Since the strength of the acrylic resin is not high, the convexities sometimes may be chipped off. Due to difference of thermal expansion ratios between that of the light guide plate and that of the frame, the convexities are stressed, resulting in breakage thereof. Widening spaces between the convexities and the holes is conceived in order to prevent the breakage. However, such space widening causes a rattle between the frame and the light guide plate. Alternatively, also in the case where an impact is delivered to the backlight unit due to dropage and so on, the convexities sometimes may be broken.

On the other hand, in a portable computer or the like using a liquid crystal display device, enlargement of a display screen thereof has been required in recent years while the display device is being miniaturized. For this reason, a border portion of the display device has been made still narrower. This is generally called "border narrowing" of the display device. The border portion is a portion between the display screen area and the end of the display device. According to such border narrowing, a width of the frame has been narrowed. Thus, it has come to be difficult for the holes for fitting the convexities of the light guide plate therein to be provided on the frame.

Against the above-described backlight unit, a backlight unit having convexities provided on a frame and locating holes formed by hollowing out a light guide plate is described, for example, in the gazette of Japanese Patent Laid-Open No. Hei 11-84351. The foregoing problems can be solved by providing the convexities on the frame. However, engaging portions where the convexities and the through holes are engaged cannot emit light. Accordingly, the engaging portions are formed onto the display area as a result of the border narrowing, thus causing a problem that a dark portion is formed on the display screen.

SUMMARY OF THE INVENTION

The object of the present invention is to solve the foregoing problems and so on.

One feature of the present invention is a panel light source device including a light source, a light guide plate for guiding and diffusing light from the light source, and a frame for housing the light guide plate, wherein the frame has a convexity inside thereof and the light guide plate has a concavity on a side or lower surface thereof, the convexity and the concavity are engaged with each other, and the light guide plate is provided in the frame so as to cover at least a part of an upper surface of the light guide plate.

In another feature of the present invention as a display device, such a display device that performs a display by controlling light projected from a backlight unit with a display panel, in which the backlight unit includes a light source, a light guide plate for guiding and diffusing light from the light source, and a frame for housing the light guide plate, wherein the frame has a convexity in an inside thereof, the light guide plate has a concavity on a side or lower surface thereof, the convexity and the concavity are engaged with each other, and the light guide plate is provided so as to cover at least a portion of an upper surface of the convexity in the frame.

Still another aspect of the present invention is a display device, which performs a display by controlling light projected from a backlight unit with a display panel, in which the backlight unit includes a light source, a light guide plate for guiding and diffusing light from the light source, and a frame for housing said light guide plate, wherein the frame has a convexity for locating the light guide plate thereon, the light guide plate has a concavity for engaging the convexity therewith, and light from the light source is projected from an upper surface of the concavity.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

For a more complete understanding of the present invention and the advantages thereof, reference is now made to the following description taken in conjunction with the accompanying drawings.

DETAILED DESCRIPTION

Figure 1:
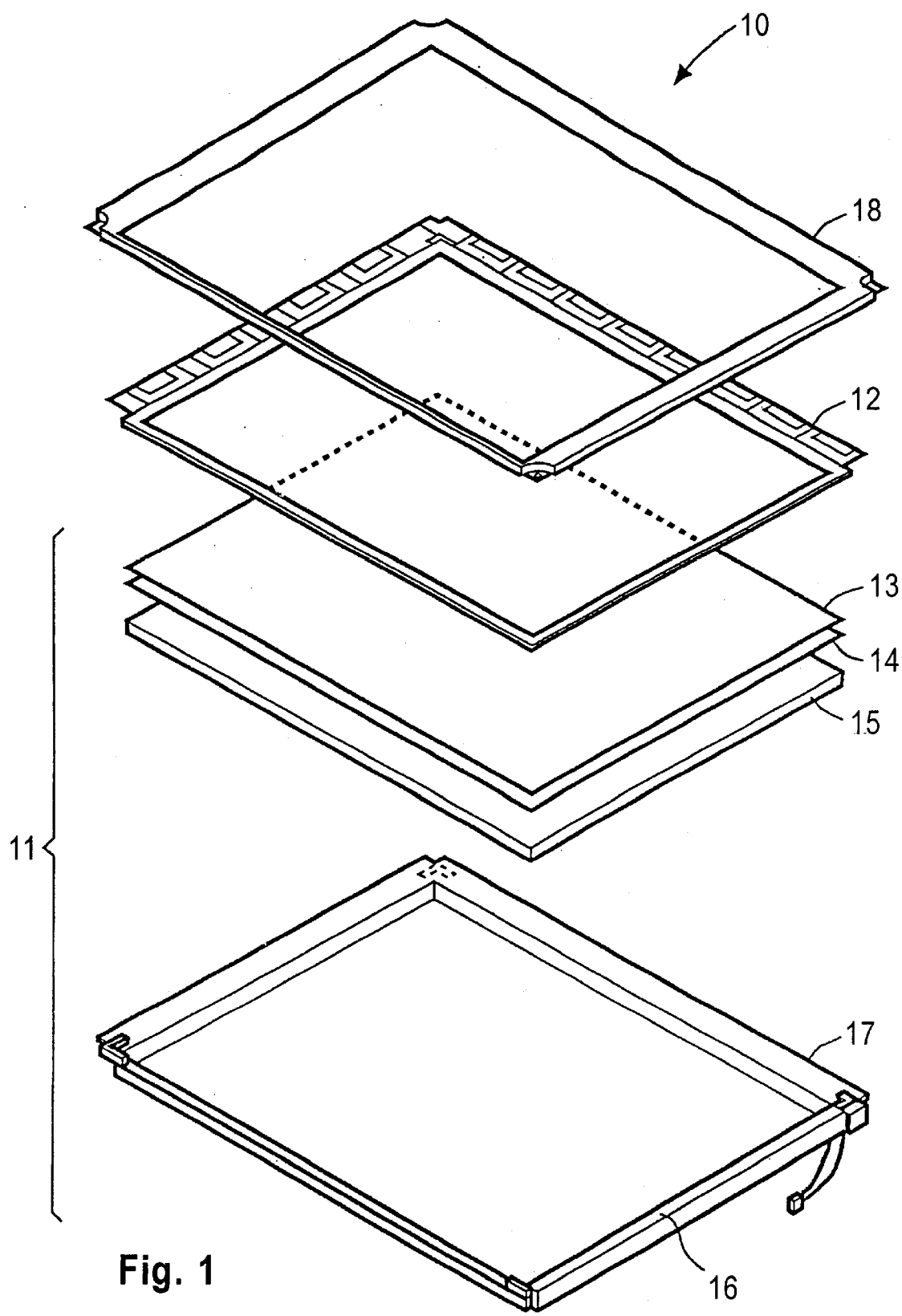
FIG. 1 is a schematic view showing a liquid crystal display device in the prior art.

A first object of the present invention is to provide a backlight unit and a display device, which are hard to be damaged due to a thermal expansion of a part or an impact from the outside. A second object of the present invention is to provide a backlight unit and a display device, which can efficiently prevent a damage of a light source due to a thermal expansion of a light guide plate.

A third object of the present invention is to provide a backlight unit and a display device which can accurately locate and fix a light guide plate and a frame even in the display device with further narrowed border. A fourth object of the present invention is to provide a backlight unit and a display device which are capable of distributing evener luminance even on a display device with further narrowed border. A fifth object of the present invention is to provide a backlight unit and a display device which are capable of accurately locating and fixing a light guide plate and a frame and at the same time distributing evener luminance.

A backlight unit of the present invention includes a light guide plate having a concavity and a frame having a convexity. Herein, the concavity and the convexity are engaged with each other, and a part of the light guide plate is formed so as to cover at least a portion of an upper surface of the convexity.

Preferably, the convexity is formed at a corner of a side and a upper surface of an inside of the frame, alternatively, an upper surface of the concavity is formed approximately at a center in a thickness direction of the light guide plate. Moreover, it is preferable that the convexity increases its width gradually toward the side or the lower surface of the frame. The convexity can be formed at a portion closer to the light source than to a center portion in a side adjacent to a light source side on which the light source is disposed.

Moreover, the above-described display device has first and second convexities, the first convexity can be formed on a side adjacent to the light source side on which the light source is disposed, the second convexity can be formed at a side opposite to the adjacent side, and the first and second convexities can be formed at positions closer to the light source than to center positions on the respective sides on which the first and second convexities are formed. Furthermore, it is preferable that the frame and the light guide plate have a first space in the side in which the light source is disposed, that the frame and the light guide plate have a second space in the side opposite to the light source, and that the first space is set smaller than the second space.

The convexity can have a width dimension and a length dimension larger than the width dimension. In this case, the width dimension of the convexity can be approximately equal to that of the concavity engaged therewith, and the length dimension of the convexity can be smaller than a length dimension of the concavity. The light guide plate can have a dot pattern formed in a periphery of the concavity, and a density or a shape of dots of the dot pattern can be adjusted so as to allow light emitted evenly from the upper surface of the light guide plate.

It is desirable that the convexity and concavity are disposed so that a thermal expansion of the light guide plate may be smaller in a side on which the light source is disposed than in a side opposite thereto. Moreover, it is preferable that a space exists between the frame and the light guide plate for absorbing the thermal expansion of the light guide plate in a side on which the light source is disposed.

Description will be made for a preferred embodiment of the present invention below. The description given below describes an embodiment of the present invention, and the present invention is not limited to the embodiment. The accompanying drawings are made for explaining the present invention, and they do not always reflect an actual shape and a dimension.

Figure 2:
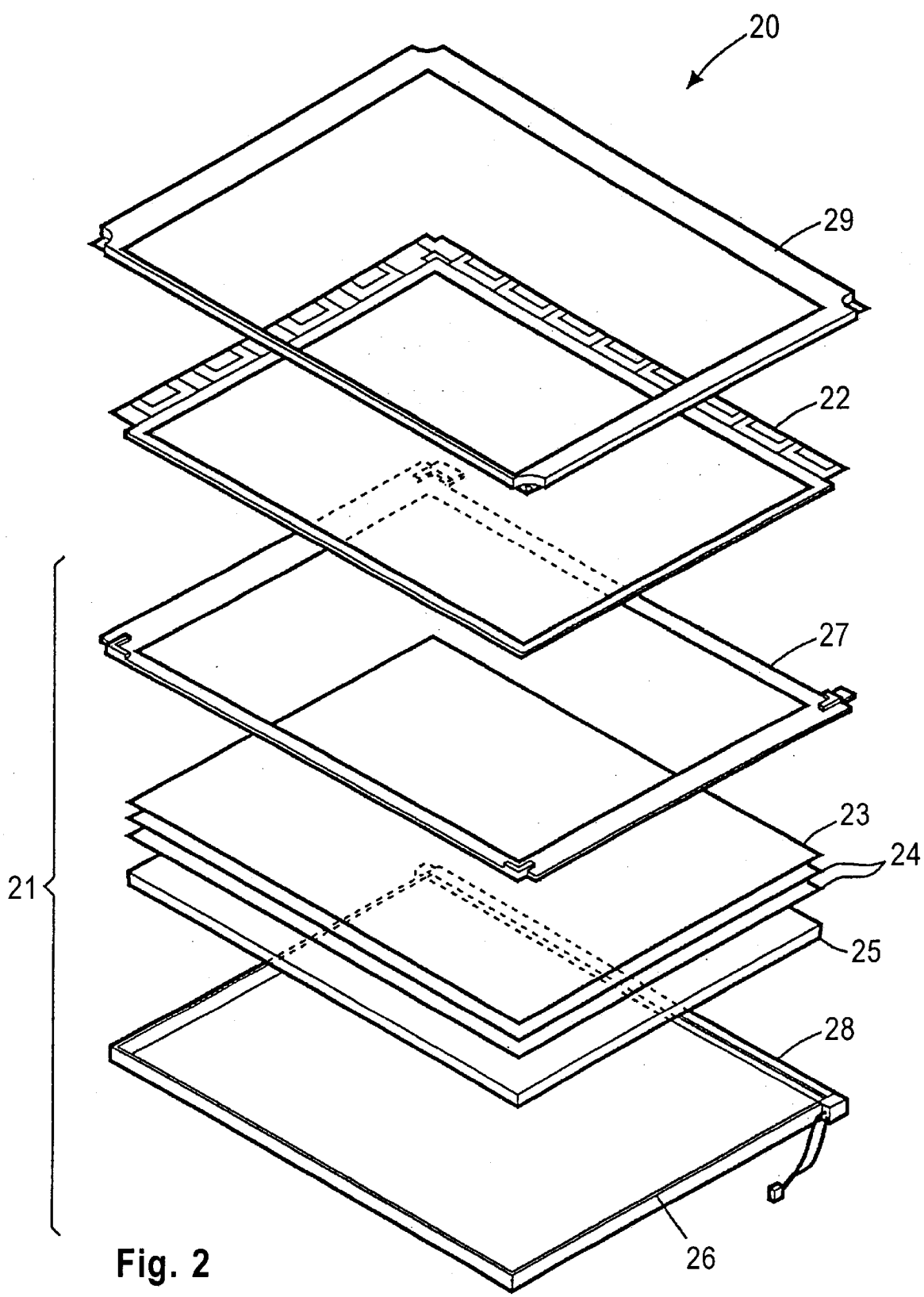
FIG. 2 is a schematic view showing the construction of a liquid crystal display device according to the embodiment of the present invention.

FIG. 2 schematically shows the construction of a liquid crystal display device according to the embodiment of the present invention. More specifically, FIG. 2 shows a liquid crystal display device 20 having a side light type backlight as a panel light source. In the drawing, a reference numeral 21 denotes a backlight unit, a liquid crystal cell 22 includes a drive circuit mounted thereon, a diffusion sheet 23 for diffusing the light makes the brightness on a liquid crystal display panel surface even, prism sheets 24 are for converging light to improve a luminance on the front surface of the display, and a light guide plate 25 is provided for guiding and diffusing the light from a light source.

A reference numeral 26 denotes a rear frame for housing parts of the backlight unit 21 such as the light guide plate 25 and the prism sheets 14 therein, and a front frame 27 for protecting and fixing an upper surface of the backlight unit. In the embodiment, a frame is made from the rear frame 26 and the front frame 27. A reference numeral 28 denotes a cold cathode tube as a light source, a numeral 29 a bezel for holding and protecting the liquid crystal cell 22 and the backlight unit 21 from the outside thereof. The backlight unit 21 includes the diffusion sheet 23, the prism sheets 24, the light guide plate 25, the frames 26 and 27 and the cold cathode tube 28 as constituent components thereof. The cold cathode tube 28 is disposed inside a curved surface of the rear frame 26 that is not directly shown in the drawing.

The optical operation of the backlight unit will now be described. Light from the cold cathode tube 28 goes through the light guide plate 25 while iterating reflection, and is projected from an upper surface of the light guide plate 25 in the direction of the liquid crystal display cell 22. An incident angle of the light in the light guide plate 25 to the surface of the light guide plate is changed by a dot pattern (not shown) formed on the upper surface or a lower surface of the light guide plate 25. Thus, the light in the light guide plate 25 is emitted from the upper surface thereof. An upper surface of the frame 26 is made as a reflection surface so as to reflect the light from the light guide plate 25.

A reflection sheet may be disposed between the rear frame 26 and the light guide plate 25. In a periphery of the cold cathode tube 28, a reflector for reflecting light from the cold cathode tube 28 is disposed. The light from the light guide plate 25 is converged in the direction of the front surface of the display surface by the prism sheets 24. Moreover, the converged light is diffused by the diffusion sheet 23, thus the luminance on the display surface is made even.

The construction of the light guide plate 25 and the rear frame 26 will now be described. The light guide plate 25 and the rear frame 26 have engaging portions for locating and fixing the light guide plate 25 onto the rear frame 26.

Figure 3:
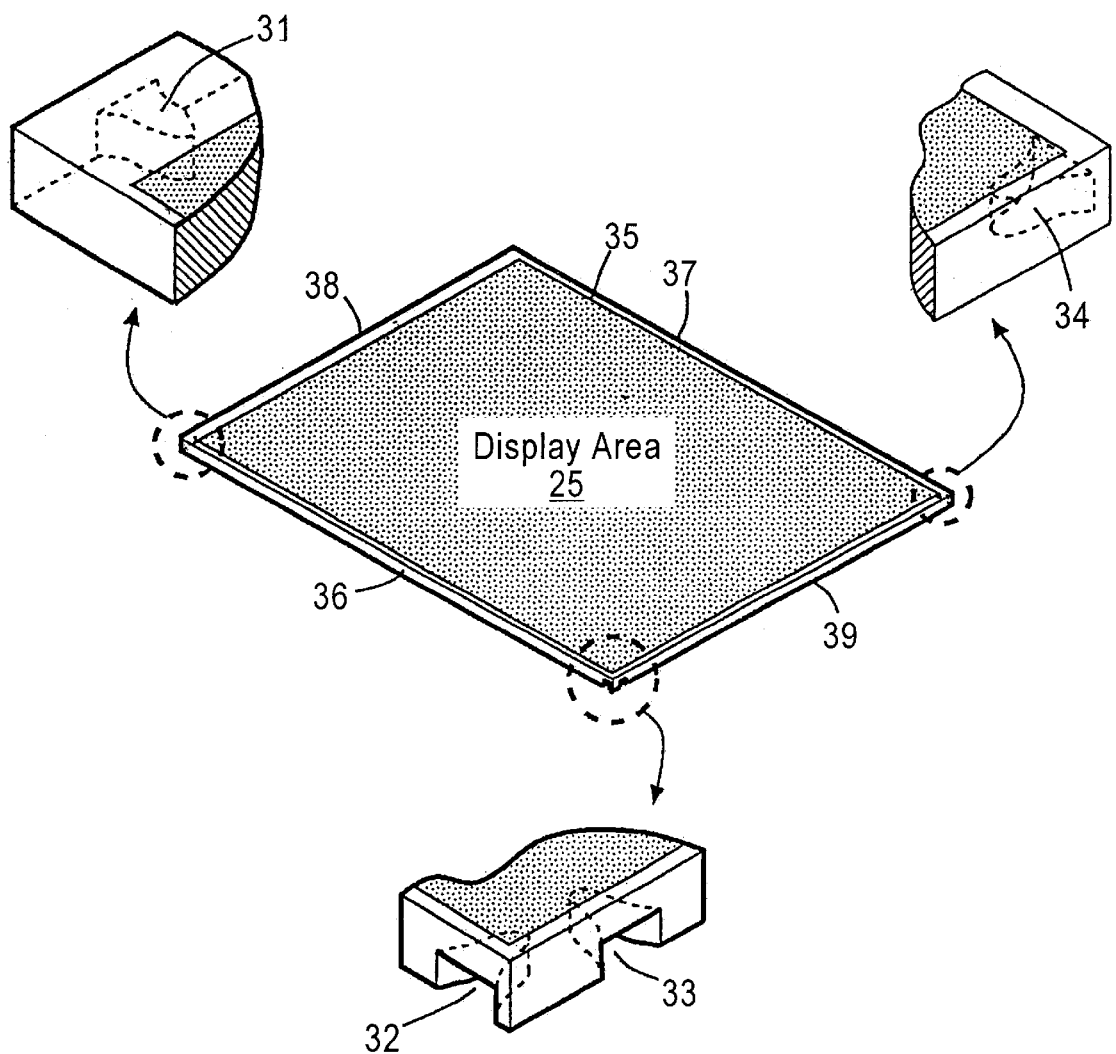
FIG. 3 shows the construction of the light guide plate according to the embodiment of the present invention.

FIG. 3 is a constructional view explaining the shape of the light guide plate 25. In the drawing, reference numerals 31 to 34 denote concavities formed on a light guide plate 25, a boundary line 35 shows a boundary between the display area and the border portion. Inside the boundary line 35 is the display area, and the outside thereof is the border portion. In the light guide plate 25, a surface facing to the liquid crystal cell 21 is defined as an upper surface, a surface opposite thereto that faces to the rear frame 26 is defined as a lower surface, the respective surfaces between the upper and lower surfaces are defined as sides. The respective sides of the light guide plate 25 are: a cold cathode tube side 36 in which the cold cathode tube 28 is disposed; a side 37 opposite to the side 36; and two sides 38 and 39 between the sides 36 and 37.

In a liquid crystal display device, whose display area has a size of 10.4 inch (211.2 mm×158.4 mm), a light guide plate has approximately the size of 220 mm×165 mm. A thickness thereof is about 5 mm. The light guide plate is formed of acrylic resin and manufactured by injection molding. The above-described light guide plate having concavities thereon can be manufactured by shaping a mold for injection molding into a desired shape. Widths of the border portions are about 2 mm in the narrow portion and about 10 mm in the wide portion. In the drawing, the side 38 and the opposite side 37 have wide border portions and the cold cathode tube side 36 and the side 39 have narrow border portions. The light guide plate 25 in the drawing is a flat light guide plate having a flat plane shape. Alternatively, a dot pattern (not shown) having a number of dots is formed on the upper surface of the light guide plate 25 so as to emit light therefrom evenly. The dot pattern is a pattern where concavities and convexities are formed or a pattern made by printing dots, and adjusts light emitted from the light guide plate by changing a reflection angle of the light. Note that, the foregoing dimensions are described only as examples. It is needless to say that various dimensions may be employed according to purposes of the display devices.

The concavities 31 to 34 are formed at corner portions of the lower surface and the sides of the light guide plate 25. Each concavity is formed as a hole hollowed from the lower surface to the side, and the hole does not reach the upper surface of the light guide plate 25. The upper surface of the light guide plate 25 does not have concavities to engage with the convexities of the rear frame 26. When viewed from the above, the concavity has a U-character shape and increases its width gradually toward the side of the light guide panel 25. Specifically, a width of the portion of the concavity which opens to the side of the light guide plate 25 is larger than that of the portion deep inside the concavity. A height (depth) of the concavity is half or more of the thickness of the light guide plate 25. Preferably, the height is about half of the thickness of the light guide plate 25.

Accordingly, an upper portion of the concavity in the height direction thereof reaches about a center of the thickness of the light guide plate 25. Concretely, the concavity has a height of 2.5 mm. The height is determined based on a balance between a function of fixing the light guide plate onto the frame and a function of emitting light from the upper portion of the concavity. The dimensions of the concavity viewed from the side are about 2.5 mm in height and 2.5 mm in width. When viewed from the above, the concavity has a length of about 5 mm from the side of the light guide plate 25. A width at the center of the length is about 2 mm. The concavity does not have an acute point and is formed so as to have a curved surface.

The concavity 31 is formed so as to be a concave portion from the side 38 to the lower surface of the light guide plate 25. The concavity does not reach the inside of the display area and is formed in the border portion. The concavity does not penetrate through the upper surface of the light guide plate 25. The concavity 31 is formed at a portion closer to the cold cathode tube 28 than to the center of the side 38 in the length direction. Preferably, the concavity 31 is formed in the vicinity of the cold cathode tube 28. Concretely, the concavity 31 is formed at a portion apart from the cold cathode tube side 36 by about 10 mm. The concavity 32 is formed at a corner of the side 36 and the lower surface of the light guide plate 25 in the vicinity of a corner of the sides 36 and 39.

A distance of the concavity 32 from the corner of the sides 36 and 39 is about 10 mm. The concavity 33 is formed at a corner of the side 39 and the lower surface of the light guide plate 25 at the front surface opposite to the concavity 31. Concretely, the concavity 33 is formed at a portion apart from the cold cathode tube side 36 by about 10 mm. The concavities 32 and 33 are not contained in the border portion and reach the display area. The concavity 34 is formed at a corner of the opposite side surface 37 and the lower surface of the light guide plate 25 at the front surface opposite to the concavity 32. Concretely, the concavity 34 is formed at a portion apart from the side 39 by about 10 mm.

Figure 4:
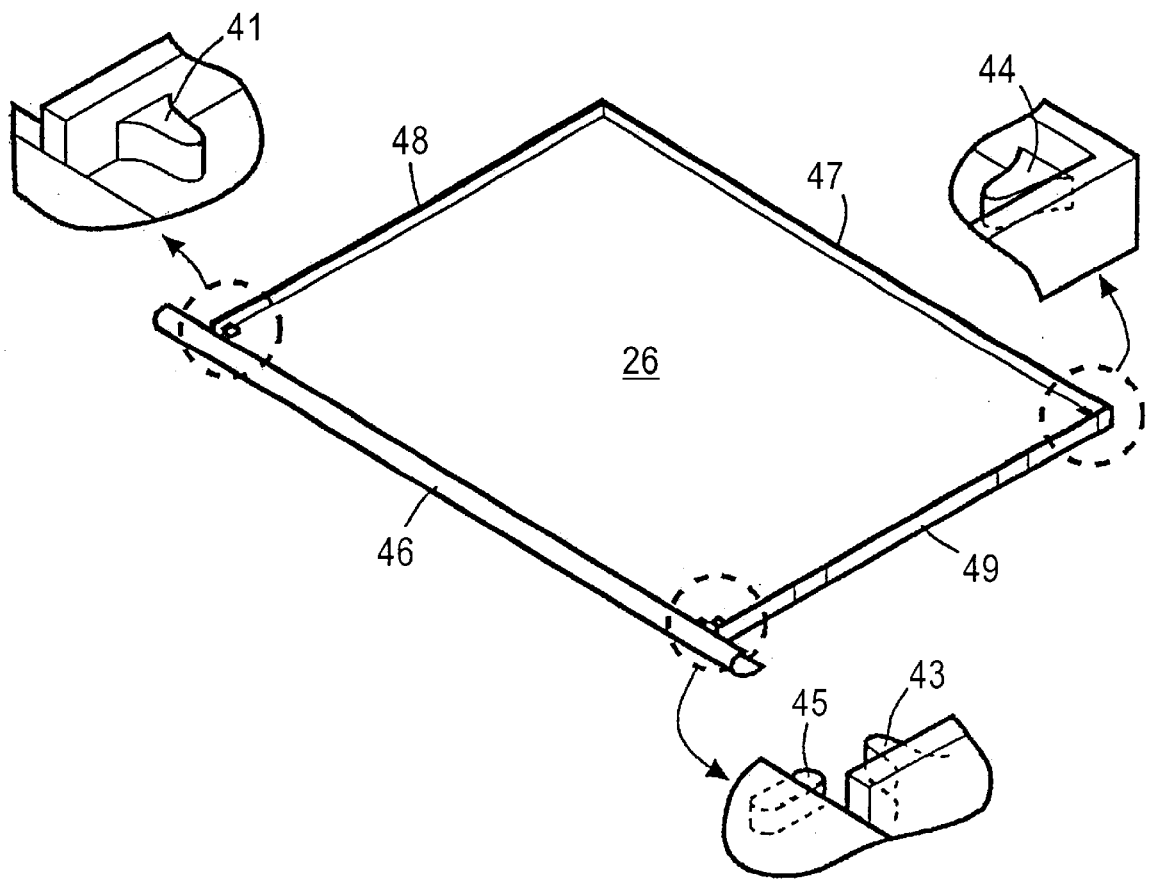
FIG. 4 shows the construction of the rear frame according to the embodiment of the present invention.

FIG. 4 is a view schematically showing the construction of the rear frame 26 for housing the light guide plate 25. In the drawing, reference numerals 41 to 44 denote convexities to engage with the concavities of the light guide plate 25, a numeral 46 a light source side of the cold cathode tube 28, a numeral 47 a side opposite to the cold cathode tube, and numerals 48 and 49 sides adjacent to the light source side 46, which are formed between the light source side 46 and the opposite side surface 47. The cold cathode tube side 46 has a curved cavity, and the cold cathode tube 28 is provided therein. Each of the convexities has a shape and a location for engaging with each of the concavities of the light guide plate 25. The rear frame 26 has a white color for reflecting light from the light guide plate 25 to increase a luminance therefrom, and is made of polycarbonate resin or Acrylonitrile-Butadiene-Styrene (ABS) resin. The rear frame 26 can be manufactured by injection molding, and each convexity is formed integrally with the rear frame.

The convexity 41 is formed at a corner of the side 48 and the upper surface of the rear frame 26, and has a shape contiguous to the side 48 and the upper surface thereof. The shape of the convexity 41 is similar to that of the concavity 31 for the purpose of engaging with the concavity 31 of the light guide plate 25. When viewed from the above, the convexities have a U-character shape and increases its width gradually toward the sides of the rear frame 26. The foot portions can act to increase strength of the convexity. Alternatively, since the convexity is formed to have a curved surface so as not to have any acute portions, damage to the light guide plate is prevented due to a contact of the convexity to the light guide plate. The convexity has a height of about 2.5 mm and a length of about 4 mm.

Herein, the height of the convexity implies a furthest distance from the upper surface of the rear frame, and the length thereof implies a furthest distance from the side 48. Alternatively, a width at the center in the length direction is about 2 mm. The convexity 43 is formed at a corner of the side 49 and the upper surface of the rear frame, and the convexity 44 is formed at a corner of the opposite side surface 47 and the upper surface of the rear frame. The respective shapes of the convexities 43 and 44 are similar to that of the convexity 41, and description thereof will be omitted. The convexity 42 is formed on the upper surface of the rear frame, and is not contiguous to the side 46. The respective locations of the convexities 41 to 44 are located where they respectively engage with the concavities of the light guide plate 25.

Figure 5:
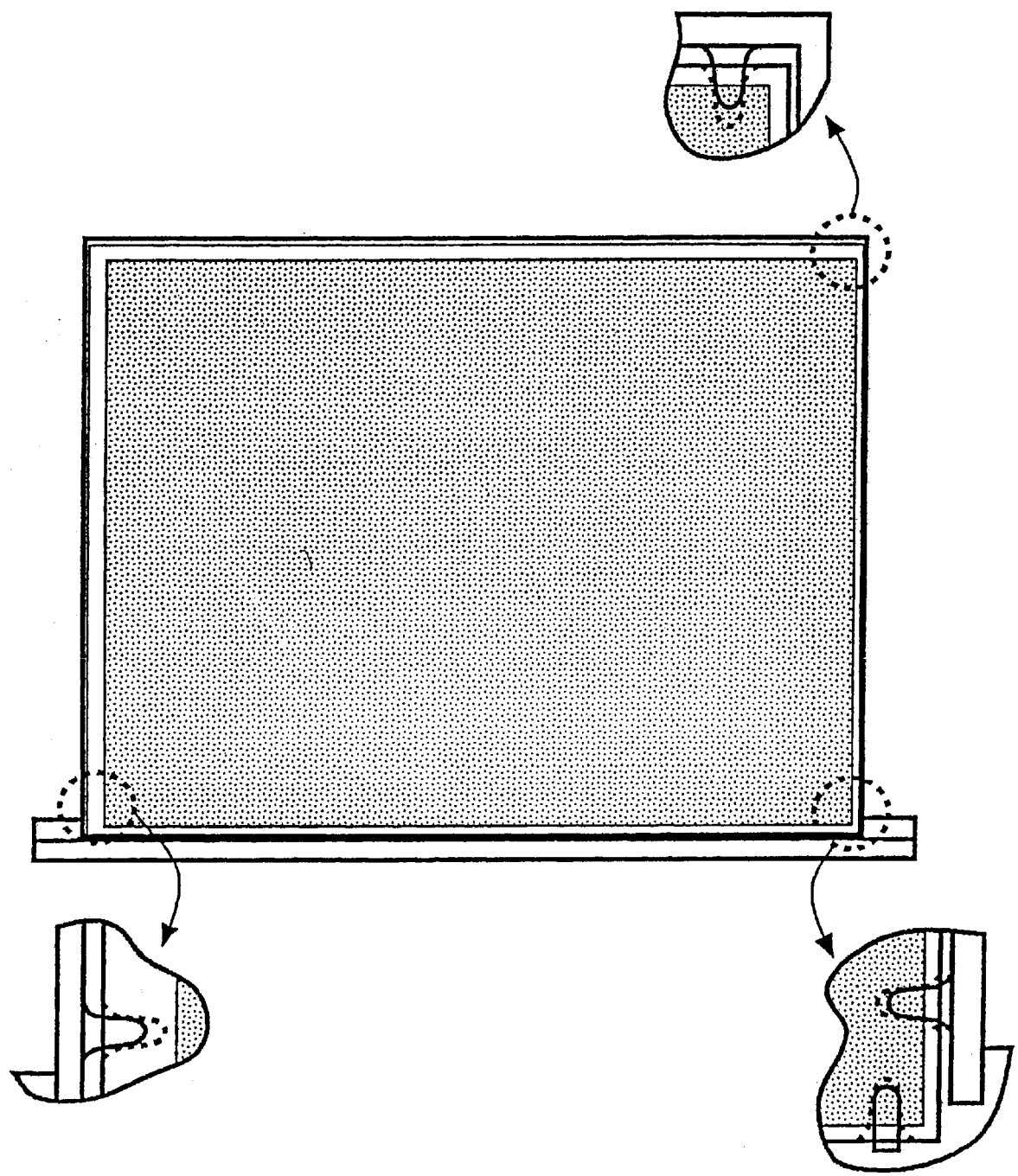
FIG. 5 shows a state where the light guide plate and the rear frame are engaged with each other.

FIG. 5 is a constructional view showing a state where the light guide plate 25 and the rear frame 26 are engaged with each other. The convexities 41 to 44 of the rear frame 26 are engaged respectively with the concavities 31 to 34 of the light guide plate 25, and the convexities 41 to 44 and the concavities 31 to 34 function as locating portions of the light guide plate and the rear frame. Alternatively, they have a function of fixing the light guide plate onto the rear frame. The light guide plate 25 is disposed so as to cover the upper surfaces of the convexities, thus light from the cold cathode tube can be projected also on the upper surfaces of the convexities. Space is provided between the inner side of the rear frame and the side of the light guide plate. The space is provided for the purpose of reducing stress caused between the light guide plate and the rear frame due to a difference of linear thermal expansion ratios between that of the rear frame and that of the light guide plate. Since the light guide plate has a larger linear thermal expansion ratio than that of the rear frame, the space can absorb an expansion amount of the light guide plate. Alternatively, because of a similar reason, spaces are also provided between the convexities and the concavities. The convexities and the concavities have spaces in their length direction, but do not have spaces in their width direction.

The light guide plate and the frame are fixed in the width direction, and a harmful influence caused from the thermal expansion is prevented. Space between the side 38 of the light guide plate and the side 48 of the rear frame is set larger than space between the side 39 and the side 49. Alternatively, space between the cold cathode tube side 36 and the cold cathode tube is set larger than space between the opposite sides 37 and 47. The spaces between the convexities and the concavities are set about as large as the space between the sides where such engaging portions are formed. Concretely, the space between the sides 38 and 48 and the space between the sides 37 and 47 opposite thereto are about 0.5 mm. The space between the cold cathode tube side 36 and the cold cathode tube and the space between the sides 39 and 49 are about 0.1 mm. Note that the linear thermal expansion ratio of acrylic resin is 1.2 m/m and that the frame hardly expands due to heat in comparison with the light guide plate made of acrylic resin. Thus, the dimension of the space can be set appropriately in consideration of the foregoing numerical value.

The size of the space is determined based on a relation thereof with a location of the engaging portion. As the engaging portion formed on each side is shifted from the center of the side, the thermal expansion of the light guide plate in the shifted direction is lowered. In the drawing, since the engaging portions on the sides 38 and 39 are formed in the vicinity of the corners thereof with the cold cathode tube side 36, the space between the side 36 and the cold cathode tube is set small and the space between the opposite sides 37 and 47 is set large. At this point it is important to dispose the engaging portions on the sides 38 and 39 adjacent to the cold cathode tube side 36 in the vicinity of the cold cathode tube. This is because destruction of the cold cathode tube due to the thermal expansion of the light guide plate can be thus prevented. The engaging portions on the sides 38 and 39 fix the light guide plate in the perpendicular direction to the cold cathode tube. Therefore, the stress possibly applied to the light guide plate 25 can be minimized since the light guide plate 25 expands more in the direction of the opposite side 47 than in the cold cathode tube side 46.

The dot pattern having a number of dots is formed on the upper or lower surface of the light guide plate. Each dot typically has a diameter of about 10 to 1000 $\mu$m. The dot pattern formed on the upper or lower surface of the light guide plate is formed and disposed so as to allow the light to be emitted evenly from the light guide plate. Since the light emitted from a particular portion of the light guide plate can be increased by increasing the density of the dots thereon, the emitted light can be made further even by reducing a dot density on a portion where the emitted light is much or a periphery thereof and by increasing dots on a dark portion of the light guide plate. In the embodiment, since the white-colored frame is used, the light source sides of the convexities become bright.

Accordingly, the luminance of the light guide plate can be made even by reducing the dot density of the foregoing bright portion. On the other hand, since the side opposite to the light source side and the upper surfaces of the convexities generally become dark, the luminance can be made even by increasing the dot density thereof. Note that the luminance can be made even also by changing the size or the shape of the dot. In general, the emitted light can be intensified by increasing the dot size, and can be attenuated by reducing the same.

It is needless to say that the present invention can be applied to a wedge-shaped light guide plate having a wedge shape in a cross section thereof as well as the flat type light guide plate. Alternatively, the convexity can be also formed so that it protrudes from the side of the frame and does not contact the lower surface of the light guide plate. From a viewpoint of strength, the convexity is preferably contiguous to both of the side and the upper surface of the frame. As long as a sufficient luminance is obtained on the front surface of the display device, the frame may be black. Thus, reflection of light on the convexity can be restricted. Alternatively, the reflection of light can be also restricted by blackening only the side of the convexity. By using a combination of the dot pattern and the diffusion sheet, allowing of the emitted light on the light guide plate to be even can be progressed. Note that the present invention can be applied not only to the LCD device but also to any display device performing a display by use of light from the light guide plate.

Although the preferred embodiment of the present invention has been described in detail, it should be understood that various changes, substitutions and alternations can be made therein without departing from spirit and scope of the inventions as defined by the appended claims.

What is claimed is:

1. A display device, which performs a display by controlling light projected from a backlight unit with a display panel, wherein said backlight unit comprises:
a light source;
a light guide plate for guiding and diffusing the light from said light source; and
a frame for housing said light guide plate,
said frame has a convexity in an inside thereof,
said light guide plate has a concavity on any of a side and a lower surface thereof,
said convexity and said concavity are engaged with each other, and
said light guide plate is provided in said frame so as to cover at least a part of an upper surface of said convexity.

2. The display device according to claim 1, wherein said convexity is formed at a corner of a side and a lower surface in the inside of said frame.

3. The display device according to claim 1, wherein an upper surface of said concavity is formed approximately at a center in a thickness direction of said light guide plate.

4. The display device according to claim 1, wherein said convexity has a foot portion expanding to any of the side and lower surface of said frame.

5. The display device according to claim 1, wherein said convexity is formed at a position closer to said light source than to a center position on a side adjacent to a light source side in which said light source is disposed.

6. The display device according to claim 1,
wherein said display device has first and second convexities, said first convexity being formed on a side adjacent to the light source side in which said light source is disposed, and said second convexity being formed on a side opposite to said adjacent side, and said first and second convexities are formed at positions closer to said light source than to center positions on the respective sides on which said first and second convexities are formed.

7. The display device according to claim 6,
wherein said frame and said light guide plate have a first space in the side in which said light source is disposed,
said frame and said light guide plate have a second space in the side opposite to said light source, and
said first space is smaller than said second space.

8. The display device according to claim 1,
wherein said convexity has a width dimension and a length dimension larger than said width dimension, said width dimension being approximately equal to that of said concavity engaged therewith, and said length dimension being smaller than the length dimension of said concavity.

9. The display device according to claim 1,
wherein said light guide plate has a dot pattern formed in a periphery of said concavity, and
any of a density and a shape of dots of said dot pattern is adjusted so as to allow light to be emitted evenly from the upper surface of said light guide plate.

10. A display device, which performs a display by controlling light projected from a backlight unit with a display panel,
wherein said backlight unit comprises:
a light source;
a light guide plate for guiding and diffusing light from said light source; and
a frame for housing said light guide plate,
said frame has a convexity for locating said light guide plate thereon,
said light guide plate has a concavity for engaging said convexity therewith, and
light from said light source is projected from an upper surface of said concavity.

11. The display device according to claim 10, wherein said convexity and concavity are disposed so that a thermal expansion of said light guide plate may be smaller in a side on which said light source is disposed than in a side opposite thereto.

12. The display device according to claim 10, wherein a space exists between said frame and said light guide plate for absorbing the thermal expansion of said light guide plate in the side on which said light source is disposed.

13. A panel light source device comprising:
a light source;
a light guide plate for guiding and diffusing light from said light source; and
a frame for housing said light guide plate,
wherein said frame has a convexity in an inside thereof,
said light guide plate has a concavity on any of a side and a lower surface thereof,
said convexity and concavity are engaged with each other, and
said light guide plate is provided in said frame so as to cover at least a part of an upper surface of said convexity.

* * * * *